United States Patent [19]

Chen

[11] 4,167,620

[45] Sep. 11, 1979

[54] METHOD FOR HEAT TREATING SHAPED ARTICLES OF AMIDE-IMIDE OR AMIC ACID POLYMERS

[75] Inventor: Yu-Tsai Chen, Glen Ellyn, Ill.

[73] Assignee: Standard Oil Company (Indiana), Chicago, Ill.

[21] Appl. No.: 874,131

[22] Filed: Feb. 1, 1978

[51] Int. Cl.² ............................................. C08G 73/14
[52] U.S. Cl. ................................. 528/481; 528/188; 528/350; 528/352; 528/353
[58] Field of Search ............... 528/350, 352, 353, 188, 528/481

[56] References Cited

PUBLICATIONS

Amoco Torlon Engineering Resins, Annealing Torlon Parts to Obtain Optimum Properties, TAT-5, Jun. 1975.

Amoco Torlon Engineering Resins, Post Curing of Torlon, TAT-5, Apr. 1977.

*Primary Examiner*—Lester L. Lee
*Attorney, Agent, or Firm*—Stephen L. Hensley; Arthur G. Gilkes; William T. McClain

[57] ABSTRACT

Process for heat treating a shaped article of polyamide-imide or polyamic acid comprising preheating the article to remove a major portion of volatiles contained in the article and generated therein and to increase the polymer's deflection temperature by about 15 to about 35° F. without deformation of the article, and heating the article at about 5° to about 25° F. below the increased deflection temperature to progressively increase the polymer's deflection temperature to substantially its maximum attainable value without deformation, said preheating and heating being carried out in the presence of a circulating gas.

13 Claims, No Drawings

METHOD FOR HEAT TREATING SHAPED ARTICLES OF AMIDE-IMIDE OR AMIC ACID POLYMERS

BACKGROUND OF THE INVENTION

This invention relates to heat treatment of shaped articles of amide-imide or amic acid polymers. More particularly, the invention relates to improvements in the heat treating of shaped articles of polyamide-imide and polyamic acids prepared from trimellitic acid or derivatives thereof and aromatic diamines whereby the physical properties, and particularly, the thermal shock resistance of such articles are significantly improved.

In the fabrication of shaped articles of thermoplastic polymers, molten polymer is commonly passed into a mold or through a die and then solidified. Shear stresses and some degree of orientation of the polymer chains develop during passage of the polymer into the mold or through the die, and when the polymer is cooled rapidly to below its glass-transition temperature, as in many commercial fabricating operations, these stresses become locked into the polymer chains. It is known that such internal stresses can be relaxed or removed by processes, commonly referred to as annealing or heat treating. As described in *Encyclopedia of Polymer Science and Technology*, Vol. 2 (1965) such processes commonly entail heating a shaped article at a temperature above the polymer's glass transition temperature or as close to the glass-transition temperature as can be attained without exceeding the deflection temperature of the polymer. Optimum heat treatment conditions vary from polymer to polymer, and even for a given polymer, optimum conditions can vary depending on part size and shape.

In the heat treatment of shaped articles of amide-imide and amic acid polymers, various chemical reactions such as imidization, chain extension, and crosslinking take place such that the molecular weights of the polymers are increased and the physical properties of the articles improved. However, such reactions also result in generation of water, carbon dioxide, and other gases during both shaping and annealing operations. At the high temperatures employed in annealing, these components vaporize and expand and, when entrapped within the articles, can exert pressures sufficient to deform the articles. Accordingly, provision must be made in the annealing of articles of polyamide-imides or polyamic acids for the removal of water and other gases contained and generated within the articles.

Prior art proposals to optimize the heat treatment of shaped articles of amide-imide and amic acid polymers have met with varying degrees of success. One such proposal which may be considered pertinent to this invention can be found in Amoco Chemicals Corporation Technical Information Bulletin TAT-5 (1975), wherein it is disclosed that the tensile strength, elongation, and deflection temperature of shaped articles of polyamide-imides identified by the Amoco Chemicals Corporation trademark TORLON can be improved by heating from 300° F. to 500° F. over a period of 48 to 192 hours depending upon the maximum thickness of the article. A related proposal is set forth in Amoco Chemicals Corporation Technical Information Bulletin TAT-5 (Rev.) (1977) wherein it is disclosed to preheat shaped TORLON articles having a maximum thickness of less than ⅜ inch from 220° to 475° F. over a period of one day with either continuous or stepwise increases in temperature. Alternately, the article can be preheated at 330° F. for one day. Following preheating, the article is heated at 475° F. for one day and then at 500° F. for one day.

Heat treatment of shaped articles according to the above-described proposals results in improvements in physical properties such as increased tensile strength, elongation, and heat deflection temperature. Moreover, the articles are suitable for use at temperatures as high as 500° F. so long as increases in temperature take place gradually. However, when articles heat treated according to the above-described proposals are subjected to large increases in temperature over short periods of time, deformation typically takes place, apparently due to a softening of the polymers and rapid expansion of water and gases incompletely removed during heat treatment and absorbed into the articles from the atmosphere. Exposure to large increases in temperature over short periods of time is referred to herein as "thermal shock." Resistance to distortion or deformation caused by thermal shock is referred to herein as "thermal shock resistance."

In view of the foregoing, it is apparent that a need still exists for a method for heat treating shaped articles of polyamide-imides and polyamic acids such that the articles are resistant to thermal shock. Accordingly, it is an object of this invention to provide such a method. It is a further object of this invention to provide an improved method for heat treating shaped articles of amide-imide and amic acid polymers whereby the tensile strength and elongation of the articles are improved. Other objects of this invention will be apparent to persons of skill in the art from the following description and appended claims.

It has now been found that the objects of this invention can be achieved by controllably heating shaped articles of polyamides-imides and polyamic acids such that a major portion of volatiles contained in the articles and generated therein are vaporized and removed during early stages of the heating and the polymer molecules undergo sufficient imidization, crosslinking, and chain extension to progressively increase the polymer's deflection temperature to substantially its maximum attainable value without deformation of the articles. The resultant heat treated articles are substantially free of water and other volatiles and the polymer molecules have undergone imidization, chain extension, and crosslinking to such an extent that only insubstantial amounts of moisture can be absorbed into the articles.

DESCRIPTION OF THE INVENTION

Briefly, the method of this invention comprises preheating a shaped article of polyamide-imide or polyamic acid in the presence of a circulating gas for a period of time such that a major portion of volatiles contained in the article and generated therein are vaporized and removed, and such that the deflection temperature of the polymer as determined by A.S.T.M. D-647-72 is increased by about 15° to about 35° F., without deformation of the article; and subsequently heating the article in the presence of a circulating gas at about 5° to about 25° F. below the increased deflection temperature to progressively increase the polymer's deflection temperature to substantially its maximum obtainable value without deformation of the article. Preheating can be carried out by heating the shaped article from an initial temperature to a final temperature with either continuous or stepwise increases in temperature over a period of time such that a major portion of volatiles are vaporized and removed and the deflection temperature of the polymer is increased without deformation of the article. Alternatively, the article can be preheated by simply heating at a single temperature for a time sufficient to vaporize and remove volatiles and increase the polymer's deflection temperature. Following preheating, the article is heated at slightly below the increased deflection temperature for a period of time sufficient to again increase the deflection temperature of the polymer without deforming the article. Heating is continued in this manner, to progressively increase the polymer's deflection temperature to substantially its maximum attainable value, until the article has been heated at about 5° to about 25° F. below such maximum deflection temperature. Preheating and heating are carried out in the presence of a circulating gas which passes through and around the shaped articles and facilitates removal of water and other volatiles therefrom.

Shaped articles which can be heat treated according to this invention are fabricated by common shaping operations such as extrusion, injection molding, compression molding, and the like. It is also contemplated to heat treat shaped articles which have been previously heat treated by conventional methods to impart thermal shock resistance thereto. The shaped articles are fabricated from polyamide-imides and polyamic acids prepared from trimellitic acid or derivatives thereof, such as trimellitic anhydride and 4-trimellitoyl anhydride halides, and aromatic primary diamines such as para- and metaphenylene diamine, para- and metaxylene diamine, oxybis(aniline), thiobis(aniline), benzidine, 1,5-diaminonaphthalene, oxybis(2-melthylaniline), thiobis(2-methylaniline), and the like. Preferably, the polymers have an initial deflection temperature of about 450° to about 470° F. and are prepared by polymerizing essentially equimolar amounts of 4-trimellitoyl anhydride chloride, or a mixture thereof with a minor amount of trimellitic anhydride, and a mixture of oxybis(aniline) and metaphenylenediamine. The initial deflection temperature of such polymers can be increased to above about 515° F. and preferably to about 520° to about 535° F. without deformation of the articles by heat treating according to this invention. More preferably, the polymers are prepared by polymerizing essentially equimolar amounts of 4-trimellitoyl anhydride chloride, or a mixture thereof with a minor amount of trimellitic anhydride, and a mixture of oxybis(aniline) and metaphenylenediamine. Most preferably, the polymers are prepared by polymerizing from about 0.9 to about 1.0 mol 4-trimellitoyl anhydride chloride, up to about 0.1 mol trimellitic anhydride, from about 0.4 to about 0.8 mol oxybis(aniline), and from about 0.2 to about 0.6 mol metaphenylenediamine. The polymers are commonly prepared in cresols or a nitrogen containing solvent, such as dimethylacetamide dimethylformamide, or N-methylpyrollidone at temperatures up to about 150° F. Further details with respect to the preparation of such polymers can be found in U.S. Pat. Nos. 3,573,260 and 4,016,140, application Ser. No. 871,103, and my presently pending application Ser. No. 850,397 filed Nov. 10, 1977, which are incorporated herein by reference. The polymers can be combined with processing aids, pigments, reinforcing materials, and the like.

In somewhat greater detail, heat treatment according to this invention comprises a preheating step in which a shaped article of the above-described polymers is heated at one or more temperatures over a period of time such that a major portion of volatiles contained and generated in the article are vaporized and removed, and the deflection temperature of the polymer is increased by about 15° to about 35° F. without deformation of the article.

When preheating is conducted by heating from an initial temperature to a final temperature over the duration of the preheating period, suitable initial temperatures are those at which water and other volatiles contained and generated in the articles being treated will be vaporized without deformation of the articles. Preferably, however, the initial preheating temperature is selected such that removal of water and volatiles is expidited and imidization, crosslinking, and chain extension take place to such an extent that the polymer's deflection temperature increases by about 15° to about 35° F. as rapidly as can be achieved without deformation of the articles. Suitably, initial temperatures range from about 212° F. to about 360° F., and preferably, from about 280° to about 350° F. For shaped articles prepared from the polymers which are preferred according to this invention, initial preheating temperatures most preferably range from about 300° to about 330° F. Suitable final preheating temperatures range from about 5° to about 25° F. below the increased deflection temperature of the polymer. Preferred final preheating temperatures range from about 5° to about 15° F. below the increase deflection temperature. For the polymers preferred herein, preferred final temperatures range from about 460° to about 480° F.

In the preheating of shaped articles from an initial to a final temperature, the temperature can be increased either continuously or in steps over the duration of the preheating period. In the former, the temperature is continuously increased by about 10° F. or less at a constant rate. Stepwise preheating comprises heating the article at the initial temperature for a portion of the preheating period, increasing the temperature to one or more intermediate temperatures and heating at such temperature for a period of time, and then increasing the temperature to the final preheating temperature. In step-wise preheating, a suitable first intermediate temperature ranges from about 20° to about 150° F. above the initial temperature. Subsequent intermediate temperatures suitably range from about 20° to about 60° F. above the preceding temperature.

In addition to preheating from an initial to a final temperature with continuous or stepwise increases in temperature, shaped articles can be preheated in a single step by heating at a single temperature which is sufficient to vaporize volatiles contained and generated in the articles and increase the deflection temperature of the polymer without deformation of the article being treated. Such temperatures range from about 280° to about 360° F. Preferred temperatures for single step preheating of shaped articles of the polymers preferred herein range from about 300° to about 330° F.

Preheating according to any of the above-described methods is carried out over a period of time which is sufficient to achieve vaporization and removal of a major portion of volatiles contained and generated in the articles and to increase the polymer's deflection temperature by about 15° to about 35° F. As a general rule preheating periods are longer for larger parts than for smaller parts because the former typically contain greater amounts of water and are more difficult to heat.

The duration of preheating also varies depending on the choice of initial temperature in continuous and stepwise preheating. For parts weighing less than about 20 to about 25 grams, continuous or stepwise preheating from an initial temperature ranging from about 280° to about 360° F. up to the final temperature is conducted over at least about 40 hours, and preferably from about 40 to about 60 hours. For larger parts, weighing about 20 to about 25 grams or more or having a thickness of at least about 1 cm, continuous and stepwise preheating from an initial temperature of about 280° to 360° F. up to the final temperature is suitably conducted over a period of at least about 60 hours, and preferably from about 60 to about 120 hours. In both continuous and stepwise preheating from initial temperatures of about 212° F. up to the final temperatures, the duration of preheating is increased by at least about 20 hours, and preferably about 20 to about 30 hours, for both large and small parts. In stepwise preheating, it is desirable to heat smaller parts at the initial temperature for at least about 20 hours, and preferably about 20 to about 30 hours, and larger parts at the initial temperature for at least about 40 hours, and preferably about 40 to about 60 hours. The remainder of the preheating period is divided into approximately equal segments for each intermediate temperature employed.

In single step preheating from an initial temperature of about 280° to about 360° F. up to the final temperature, the preheating period is at least about 20 hours, and preferably about 20 to about 30 hours, for smaller parts and at least about 40 hours, and preferably for about 40 to about 60 hours for larger and thicker parts. Although single step preheating typically can be completed more rapidly than continuous or stepwise preheating, the latter methods lead to maximum increases in tensile strength and elongation.

For parts fabricated from the polymers preferred according to this invention, the following preheating schedules result in maximum improvements in physical properties at maximum speed. Continuous preheating comprises heating from about 300° to about 330° F. up to about 460° to about 480° F. over a period of about 40 to about 60 hours for smaller parts and over a period of about 60 to about 120 hours for larger parts. Stepwise preheating of smaller parts comprises heating at about 300° to about 330° F. for about 20 to about 30 hours, and then at about 410° to about 430° F. for about 20 to about 30 hours. Stepwise preheating of larger parts comprises heating at about 300° to about 330° F. for about 40 to about 60 hours, then at about 410° to about 430° F. for about 20 to about 30 hours, and then at about 440° to about 460° F. for about 20 to about 30 hours. Single step preheating comprises heating at about 300° to about 330° F. for about 20 to about 30 hours for smaller parts and for about 40 to about 60 hours for larger parts.

As a result of preheating, a major portion of volatiles contained and generated in the article being treated are vaporized and removed and the heat deflection temperature of the polymer is increased by about 15° to about 35° F., without deformation of the article.

Following preheating, the article is heated in the presence of a circulating gas at about 5° to about 25° F., and preferably about 5° to about 15° F. below the increased deflection temperature of the polymer for a period of time such that substantial imidization, chain extension, and crosslinking take place without deformation of the article. As a result of such heating, water and other gases continue to be generated and removed and the molecular weight and deflection temperature of the polymer is again increased. The heating is conducted for a period of time sufficient to increase the deflection temperature by about 15° to about 35° F. Preferably the heating is at a temperature ranging from about 450° to about 490° F. for a period of at least 20 hours, for both larger and smaller parts.

Following the above-described heating, the temperature is increased to about 5° to about 25° F. below the polymer's new deflection temperature and held at such temperature for a time sufficient to again increase the polymer's deflection temperature by about 15° to about 35° F. Suitably, the heating is at about 480° to about 520° F. for a period of at least about 20 hours for both larger and smaller parts. Heating is continued in this manner to increase the polymer's deflection temperature to substantially its maximum attainable value without deformation of the article being treated. The final heating stage is carried out at about 5° to about 25° F., and preferably about 5° to about 15° F. below the maximum attainable temperature for at least about 20 hours and more preferably, at least about 40 hours. Maximum deflection temperatures can be determined in accordance with A.S.T.M. D-648-72.

In the heat treatment of shaped articles of the polyamide-imides and polyamic acids preferred herein, maximum improvements in physical properties of smaller parts are achieved at maximum speed by heating according to the following schedule. After completion of preheating, the articles are heated at about 460° to about 480° F. for about 20 to about 30 hours, then at about 490° to about 510° F. for about 20 to about 30 hours, and then at about 505° to about 525° F. for about 20 to about 60 hours. Larger parts are most preferably heated to according to the same schedule except for about 40 to about 60 hours at 505° to 525° F.

Following heat treatment according to this invention, the treated articles are cooled. Special precautions need not be taken in cooling of the articles.

Heat treatment according to this invention is carried out in the presence of a circulating gas which flows through and around the articles so as to remove water and other gases therefrom. The gas is preferably circulated so as to maximize removal of water and other gases without causing substantial variations in temperature. While inert gases such as nitrogen are suitable, it is preferred that the circulating gas be an oxygen-containing gas such as air because oxygen tends to facilitate crosslinking of the polymer molecules.

The method of this invention can be carried out in any apparatus which is suitable for heating shaped articles, as described herein, in the presence of a circulating gas. Circulating air ovens are most conveniently employed. Cam-controlled ovens are particularly well suited for use when it is desired to preheat with continuous increases in temperature. It is also contemplated to employ a series of ovens, each of which is set at a constant temperature representing a discreet phrase of the heat treatment, and to transfer the articles from oven to oven until the treatment is completed. In placing articles to be treated in an oven or other suitable apparatus, care should be taken to avoid limiting the flow of air or other gas through and between the articles.

Articles heat treated according to this invention are resistant to thermal shock at temperatures of at least 500° F. and exhibit significantly improved tensile strength and elongation as compared with untreated articles or articles treated according to the above-described prior art proposals. Articles treated according to this invention can be used as jet engine components and in other applications in which large increases in temperature occur over relatively short periods of time.

The following examples illustrate the present invention and are not to be construed as limiting the scope thereof.

EXAMPLE I

Test bars having a weight of less than about 10 grams and a thickness less than 0.5 cm. were injection molded on a 5 ounce Stokes injection molding machine from a polyamide-imide having an initial deflection temperature of about 455° F. and prepared by polymerizing 4-trimellitoyl anhydride chloride, oxybis(aniline), and metaphenylene diamine in a molar ratio of 1.0/0.7/0.3 in dimethylacetamide at 40° to 100° F. Prior to molding of the test bars, the polymer had been washed with deionized water, flash dried at 250° F., steam dried at 300° F., heated in a vacuum oven from 350° to 460° F. for 16 hours, and blended with 3 wt.% $TiO_2$ as a pigment. Prior to heating in the vacuum oven, the polymer had a molecular weight of about 6500 to 7000 as determined by gel permeation chromatography.

(A) Test bars were heat treated in a vented Blue M POWER-O-MATIC 60 circulating air oven equipped with an internal fan. The air inlet valve was opened to about 30° and the outlet valve was opened to about 45° to provide for optimum circulation of air. The test bars were continuously preheated from 220° F. to 470° F. over a period of 22 hours, and then heated for 24 hours at 470° F. The temperature was then increased to 500° F. in 3 hours and heating continued at 500° F. for 24 hours, and then at 510° F. for 48 hours. The test bars were then removed from the oven and cooled to ambient temperature. Tensile strength and elongation of the heat treated test bars were determined at room temperature according to A.S.T.M. D-638. Results are reported in Table I.

(B) For comparative purposes, test bars were heat treated as described above but according to the following schedule: temperature was continuously increased from 250° to 500° F. over 24 hours, and then the temperature was held at 500° F. for 24 hours. Tensile strength and elongation, determined at room temperature in accordance with A.S.T.M. D-638, are reported in Table I.

(C) Also for comparative purposes, the tensile strength and elongation of as-molded test bars were determined at room temperature in accordance with A.S.T.M. D-638. Results are reported in Table I.

TABLE I

| Sample | Tensile Strength ($\times 10^4$ psi) | Tensile Elongation (%) |
|---|---|---|
| (A) | 3.08 | 17 |
| (B) | 2.30 | 6.85 |
| (C) | 1.42 | 3.59 |

Example I and Table I show the significant improvements in tensile strength and elongation achieved by heat treatment according to the present invention (Sample A) as compared with conventional heat treatment methods (Sample B), and untreated test bars (Sample C).

EXAMPLE II

Test bars prepared in Example I(A) were conditioned at room temperature and approximately 100% relative humidity for 5 days. The test bars were then placed in an oven which had been heated to 510° F. The test bars were removed from the oven after 5 hours of heating at 510° F. No deformation was observed.

To simulate prolonged aging of parts, test bars prepared in Example I(A) were soaked in tap water at room temperature over a number of days. After each 24 hour interval, one wet test bar was thermal shocked at 510° F. and inspected for deformation after at least 5 hours. No deformation was observed for the test bars soaked for up to 9 days. Test bars soaked for 12 days blistered slightly and became brittle due to thermal shock.

By way of comparison, test bars prepared in Example I(B) deformed significantly when placed into an oven heated at 500° F.

This example demonstrates that resistance to thermal shock at temperatures of 500° F. or above can be imparted to shaped articles of polyamide-imides or polyamic acids by heat treatment according to this invention. Moreover, the example demonstrates that this resistance to thermal shock will be retained even after prolonged aging of parts under typical storage conditions. In contrast, test bars heat treated by conventional methods deform significantly when thermal shocked at 500° F., even without soaking or exposure to humidity.

EXAMPLE III

Test bars having a weight of less than about 10 grams and a thickness less than 0.5 cm. were prepared according to the procedure described in Example I. The test bars were prepared from a polyamide-imide which was prepared by polymerizing 4-trimellitoyl anhydride chloride, trimellitic anhydride, oxybis(aniline), and metaphenylene diamine in a molar ratio of 1.0/0.07/0.8/0.34 in N-methylpyrrolidone at 36° to 116° F. Prior to molding, the polymer had been washed with deionized water, flash dried at 250° F., steam dried at a steam pressure of 125 psi., heated in a vacuum oven from 350° to 450° F. for 2 hours, and blended with 3 wt.% $TiO_2$, 0.5 wt.% polytetraflouroethylene, and 10 wt.% of a similarly prepared low melt flow rate polyamide-imide. Prior to heating in the vacuum oven, the polyamide-imide had a molecular weight of about 6000 as determined by gel permeation chromatography. The low melt flow rate polymer had a molecular weight of about 6500 to 7000.

(A) Test bars were heat treated in the manner described in Example I(A) but according to the following schedule: preheat at 330° F. for 24 hours, heat at 470° F. for 24 hours, then at 500° F. for 24 hours, and then at 515° F. for 24 hours. The heat treated test bars were removed from the oven and cooled to ambient temperature. Tensile and flexural properties at room temperature, determined in accordance with A.S.T.M. D-638 and D-790 respectively, are reported in Table II. As a result of the heat treatment, the deflection temperature of the polymer was increased from 455° F. to about 525° F. as determined according to A.S.T.M. D-648-72.

(B) For comparative purposes, test bars were heat treated according to Example I(A) but according to the following schedule: preheat at 330° F. for 24 hours, heat at 470° F. for 24 hours, and then at 500° F. for 24 hours.

Tensile and flexural properties are reported in Table II.

TABLE II

| Sample | A | B |
|---|---|---|
| Tensile Strength ($\times 10^4$ psi) | 2.85 | 2.82 |
| Tensile Elongation (%) | 18.8 | 16.2 |
| Flexural Strength ($\times 10^4$ psi) | 3.32 | 3.24 |
| Flexural Modulus ($\times 10^5$ psi) | 6.87 | 6.52 |

EXAMPLE IV

Test bars prepared in Examples III(A) and III(B) were thermally shocked for 4 hours in an oven which had been preheated to 500° F. As a result of this thermal shock, the test bars of Example III(B) deformed significantly while no deformation of the Example III(A) test bars was observed.

EXAMPLE V

A polyamide-imide prepared as described in Example III was extruded to form cylinders having a length of about 8 cm., a diameter of 2.5-3 cm., and a weight of about 60 grams.

(A) One cylinder was heat treated by the procedure described in Example I(A) but according to the following schedule: preheat at 330° F. for 48 hours, heat at 470° F. for 24 hours, at 500° F. for 24 hours, and then at 515° F. for 48 hours.

(B) A second cylinder was heat treated by the procedure described in Example I(A) but according to the following schedule: preheat at 330° F. for 48 hours, heat at 470° F. for 24 hours, and then at 500° F. for 24 hours.

After cooling to room temperature, cylinders (A) and (B) were thermally shocked at 500° F. for 4 hours. As a result of the thermal shock, cylinder (B) deformed. No deformation of cylinder (A) was observed.

Examples III-V and Table II demonstrate the thermal shock resistance and improvements in physical properties achieved by heat treating both large and small parts according to this invention as compared with conventional heat treating methods.

I claim:

1. A process for heat treating a shaped article of polyamide-imide or polyamic acid comprising the steps of (1) preheating the article to vaporize and remove volatiles contained in the article and generated therein, and increase the deflection temperature of the polymer, as determined by A.S.T.M. D-648-72, by about 15° to about 35° F. without deformation of the article; and (2) heating the article at about 5° to about 25° F. below the increased deflection temperature to progressively increase the deflection temperature to substantially its maximum attainable value without deformation of the article; said preheating and heating being carried out in the presence of a circulating gas.

2. The process according to claim 1 wherein the circulating gas is an oxygen-containing gas.

3. The process according to claim 2 wherein the polyamide-imide or polyamic acid has an initial deflection temperature of about 450° to about 470° F. and is a polymer of at least one trimellitic acid derivative, from about 0.4 to about 0.8 mol oxybis(aniline) per mol of trimellitic acid derivative, and from about 0.2 to about 0.6 mol metaphenylene diamine per mol of trimellitic acid derivative.

4. The process according to claim 3 wherein the shaped article has a weight of less than about 20 to about 25 grams and the heating at about 5° to about 25° F. below the polymer's increased deflection temperature in step (2) comprises:
   (a) heating the article at a temperature ranging from about 460° to about 480° F. for about 20 to about 30 hours.
   (b) heating the article at a temperature ranging from about 490° to about 510° F. for about 20 to about 30 hours, and
   (c) heating the article at a temperature ranging from about 505° to about 525° F. for about 20 to about 60 hours.

5. The process according to claim 4 wherein the preheating in step (1) comprises heating the article at about 300° to about 330° F. for about 20 to about 30 hours.

6. The process according to claim 4 wherein the preheating in step (1) comprises heating the article from an initial temperature ranging from about 300° to about 330° F. to a final temperature ranging from about 460° to about 480° F. with continuous increases in temperature over a period of about 20 to about 60 hours.

7. The process according to claim 4 wherein the preheating in step (1) comprises heating the article at about 300° to about 330° F. for about 20 to about 30 hours and then at about 410° to about 430° F. for about 20 to about 30 hours.

8. The process according to claim 4 wherein the oxygen containing gas is air.

9. The process according to claim 3 wherein the shaped article has a weight of at least about 20 to about 25 grams and the heating at about 5° to about 25° F. below the polymer's increased deflection temperature in step (2) comprises:
   (a) heating the article at a temperature ranging from about 460° to about 480° F. for about 20 to about 30 hours,
   (b) heating the article at a temperature ranging from about 490° to about 510° F. for about 20 to about 30 hours, and
   (c) heating the article at a temperature ranging from about 505° to about 525° F. for about 40 to about 60 hours.

10. The process according to claim 9 wherein the preheating in step (1) comprises heating the article at about 300° to about 330° F. for about 40 to about 60 hours.

11. The process according to claim 9 wherein the preheating in step (1) comprises heating the article from an initial temperature ranging from about 300° to about 330° F. to a final temperature ranging from about 460° to about 480° F. with continuous increases in temperature over a period of about 60 to about 120 hours.

12. The process according to claim 9 wherein the preheating in step (1) comprises heating the article at about 300° to about 330° F. for about 40 to about 60 hours, at about 410° to about 430° F. for about 20 to about 30 hours, and then at about 440° to about 460° F. for about 20 to about 30 hours.

13. The process according to claim 9 wherein the oxygen-containing gas is air.

* * * * *

UNITED STATES PATENT OFFICE
CERTIFICATE OF CORRECTION

Patent No. 4,167,620      Dated September 11, 1979

Inventor(s) YU-TSAI CHEN

It is certified that error appears in the above-identified patent and that said Letters Patent are hereby corrected as shown below:

| Patent Column | Line | |
|---|---|---|
| 2 | 59 | "A.S.T.M. D-647-72" should read -- A.S.T.M. D-648-72 -- |

Signed and Sealed this

Eighth Day of January 1980

[SEAL]

Attest:

SIDNEY A. DIAMOND

Attesting Officer     Commissioner of Patents and Trademarks